US006921298B2

(12) United States Patent
Sasaki (10) Patent No.: US 6,921,298 B2
(45) Date of Patent: Jul. 26, 2005

(54) PRESS-CONTACT TYPE CONNECTOR FOR CELLULAR PHONES AND CONNECTING STRUCTURE THEREFOR

(75) Inventor: Yuichiro Sasaki, Matsumoto (JP)

(73) Assignee: Shin-Etsu Polymer Co., Ltd., Tokyo ( * ) Notice: Subject to any disclaimer, the term of this patent is extended or adjusted under 35 U.S.C. 154(b) by 0 days.

(21) Appl. No.: 10/475,410

(22) PCT Filed: Apr. 25, 2002

(86) PCT No.: PCT/JP02/04110

§ 371 (c)(1),
(2), (4) Date: Oct. 21, 2003

(87) PCT Pub. No.: WO02/091525

PCT Pub. Date: Nov. 14, 2002

(65) Prior Publication Data

US 2004/0142730 A1 Jul. 22, 2004

(30) Foreign Application Priority Data

May 1, 2001 (JP) .................................... 2001-134411

(51) Int. Cl.[7] ............................................. H01R 13/24
(52) U.S. Cl. ........................................ 439/700; 439/824
(58) Field of Search ............................... 439/886, 700, 439/824

(56) References Cited

U.S. PATENT DOCUMENTS 6,340,320 B1 * 1/2002 Ogawa ........................ 439/824
6,783,405 B1 * 8/2004 Yen ............................. 439/824
2002/0195455 A1 12/2002 Takahashi et al.
2003/0176113 A1 9/2003 Sasaki
2003/0190825 A1 10/2003 Sasaki

FOREIGN PATENT DOCUMENTS

| JP | 09-45407 A1 | 2/1997 |
| JP | 10-214649 A1 | 8/1998 |
| JP | 2001-68183 A1 | 3/2001 |

OTHER PUBLICATIONS

Patent Abstracts of Japan for JP2001–68183 published on Mar. 16, 2001.
Patent Abstracts of Japan for JP10–214649 published on Aug. 11, 1998.
Patent Abstracts of Japan for JP09–45407 published on Feb. 14, 1997.

* cited by examiner

Primary Examiner—Khiem Nguyen
(74) Attorney, Agent, or Firm—Darby & Darby (57) ABSTRACT

A housing 20 integrally formed with a light guide 10 in which a liquid crystal module of a cellular phone is mounted, a multiple number of hollow, conductive toe-pins 28 which are inserted in respective passage holes 23 of the housing 20 and slidably come out from the undersurface of housing 20, and conductive head pins 30 which each are fitted into respective conductive toe-pins 28 and slidably come out from the top surface of housing 20, are provided. A coil spring 32 is interposed between each conductive toe-pin 28 and conductive head pin 30 and elastically urges the conductive toe-pin 28 and conductive head pin 30, so that they come out from both sides of housing 20.

8 Claims, 5 Drawing Sheets

PRESS-CONTACT TYPE CONNECTOR FOR CELLULAR PHONES AND CONNECTING STRUCTURE THEREFOR

TECHNICAL FIELD

The present invention relates to a press-contact type connector for cellular phones and a connecting structure therefor, and more detailedly relates to a press-contact type connector used for electric connection between a liquid crystal module (COG, COF) for the display of a cellular phone and a circuit board.

BACKGROUND ART

Conventionally, when a liquid crystal module of a cellular phone is electrically connected to an electronic circuit board, though not illustrated, a press-contact type connector is press fitted into an attachment hole of a light guide that constitutes the cellular phone, and this press-contact type connector is compressively sandwiched between the liquid crystal module and the electronic circuit board so as to establish conduction between the liquid crystal module and electronic circuit board. This press-contact type connector has a multiple number of conductive metal wires arranged on the curved surface of a resilient elastomer having a semi-elliptic section, these conductive metal wires establishing conduction between the liquid crystal module and electronic circuit board.

Since, in the conventional press-contact type connector for cellular phones, a separate press-contact type connector is merely press fitted into the light guide attachment hole as described, it entails critical problems in that the press-contact type connector may set skewed or may be buckled due to the way of, and conditions of pressing. Further, since the light guide attachment hole needs to be shaped with high dimensional accuracy, the shaping faces marked difficulties.

On the other hand, since recent cellular phones are fervently being developed into thin, compact and light-weighted configurations, the press-contact type connector needs to be reduced in height to follow this trend. However, since the conventional press-contact type connector is constructed as stated above, it is extremely difficult to reduce the height (about 5 mm), hence it is impossible to shorten the conduction path. There is also a strong demand for a press-contact type connector that can establish connection with a low load.

The present invention has been devised in the above view. It is therefore an object of the present invention to provide a press-contact type connector for cellular phones and a connecting structure therefor, which is free from skewed connector setting and can realize low-load connection with a shortened conduction path by reducing the connector height.

DISCLOSURE OF INVENTION

The present invention has been devised in order to achieve the above object, and the gist of the invention is as follows:

The first aspect of the present invention resides in a press-contact type connector for cellular phones, comprising: a hollow, conductive toe-pin which is inserted in a passage hole of a housing and exposed from one side of the housing; and a conductive head pin which is fitted into the conductive toe-pin and is slidably projected from the opposite side of the housing, characterized in that the housing and a light guide to which at least a liquid crystal module is mounted are integrated, a spring element is provided between the conductive toe-pin and the conductive head pin so as to urge at least the conductive head pin in the direction of the opposite side of the housing.

Next, the second aspect of the present invention resides in the press-contact type connector for cellular phones defined in the above first aspect, wherein the distal end of the conductive head pin is inclined at a predetermined angle with respect to a plane perpendicular to the axis of the passage hole of the housing, so that the conductive head pin is contacted with the conductive toe-pin in an inclined position within the conductive toe-pin, establishing a conduction path between the conductive toe-pin and conductive head pin thus in contact.

Further, the third aspect of the present invention resides in the press-contact type connector for cellular phones defined in the above first aspect, wherein an engagement flange for the spring element is projected outwardly from the outer peripheral surface of each of the conductive toe-pin and the conductive head pin, the opposing face that opposes the engagement flange of the conductive toe-pin, of the engagement flange of the conductive head pin is inclined at a predetermined angle with respect to a plane perpendicular to the axis of the passage hole, so that the conductive head pin is contacted with the conductive toe-pin in an inclined position within the conductive toe-pin, establishing a conduction path between the conductive toe-pin and conductive head pin thus in contact.

Moreover, the fourth aspect of the present invention resides in a connecting structure for a press-contact type connector for cellular phones, characterized in that the press-contact type connector for cellular phones comprises: a hollow, conductive toe-pin which is inserted in a passage holes of a housing and exposed from one side of the housing; and a conductive head pin which is fitted into the conductive toe-pin and is slidably projected from the opposite side of the housing, wherein the housing and a light guide to which at least a liquid crystal module is mounted are integrated, a spring element is provided between the conductive toe-pin and the conductive head pin so as to urge at least the conductive head pin in the direction of the opposite side of the housing, and the press-contact type connector is disposed between a pair of opposing electrodes so as to establish conduction.

Still more, the fifth aspect of the present invention resides in the connecting structure for a press-contact type connector for cellular phones defined in the above fourth aspect, wherein the distal end of the conductive head pin is inclined at a predetermined angle with respect to a plane perpendicular to the axis of the passage hole of the housing, so that the conductive head pin is contacted with the conductive toe-pin in an inclined position within the conductive toe-pin, establishing a conduction path between the conductive toe-pin and conductive head pin thus in contact.

Next, the sixth aspect of the present invention resides in the connecting structure for a press-contact type connector for cellular phones defined in the above fourth aspect, wherein an engagement flange for the spring element is projected outwardly from the outer peripheral surface of each of the conductive toe-pin and the conductive head pin, the opposing face that opposes the engagement flange of the conductive toe-pin, of the engagement flange of the conductive head pin is inclined at a predetermined angle with respect to a plane perpendicular to the axis of the passage hole, so that the conductive head pin is contacted with the conductive toe-pin in an inclined position within the conductive toe-pin, establishing a conduction path between the conductive toe-pin and conductive head pin thus in contact.

Here, the housing in the present invention can be modified freely in shape, and may be given in a rectangular, square, oval or other form. The conductive toe-pin may be projected or may be projected by the spring element and slidable as long as it is exposed from one side of the housing. The light guide should be configured so that at least the liquid crystal module can be mounted, and may be configured so that electro-acoustic parts (e.g., speakers, various types of microphones), peripheral connector parts such as keypads etc. can be mounted. The spring element is generally of a coil spring, but other kinds of springs may be selected as long as they can provide the same function. Further, there are various types of cellular phones, but the invention can be applied to any type.

BEST MODE FOR CARRYING OUT THE INVENTION

Now, preferred embodiment of the present invention will be described with reference to the drawings. A press-contact type connector for cellular phones in the present embodiment includes: as shown in FIGS. 1 through 12, a housing 20 built in and integrally formed in the lower part of a light guide 10 in which a liquid crystal module 1 of the cellular phone is arranged; a multiple number of hollow, conductive toe-pins 28 which are inserted in respective passage holes 23 of the housing 20 and slidably come out from the undersurface of housing 20; conductive head pins 30 which each are fitted into respective conductive toe-pins 28 and slidably come out from the top surface of housing 20. A coil spring 32 is interposed between each conductive toe-pin 28 and conductive head pin 30 and elastically urges the conductive toe-pin 28 and conductive head pin 30 arranged coaxially, so that they come out from the top and bottom surfaces of housing 20.

Figures 6, 7:
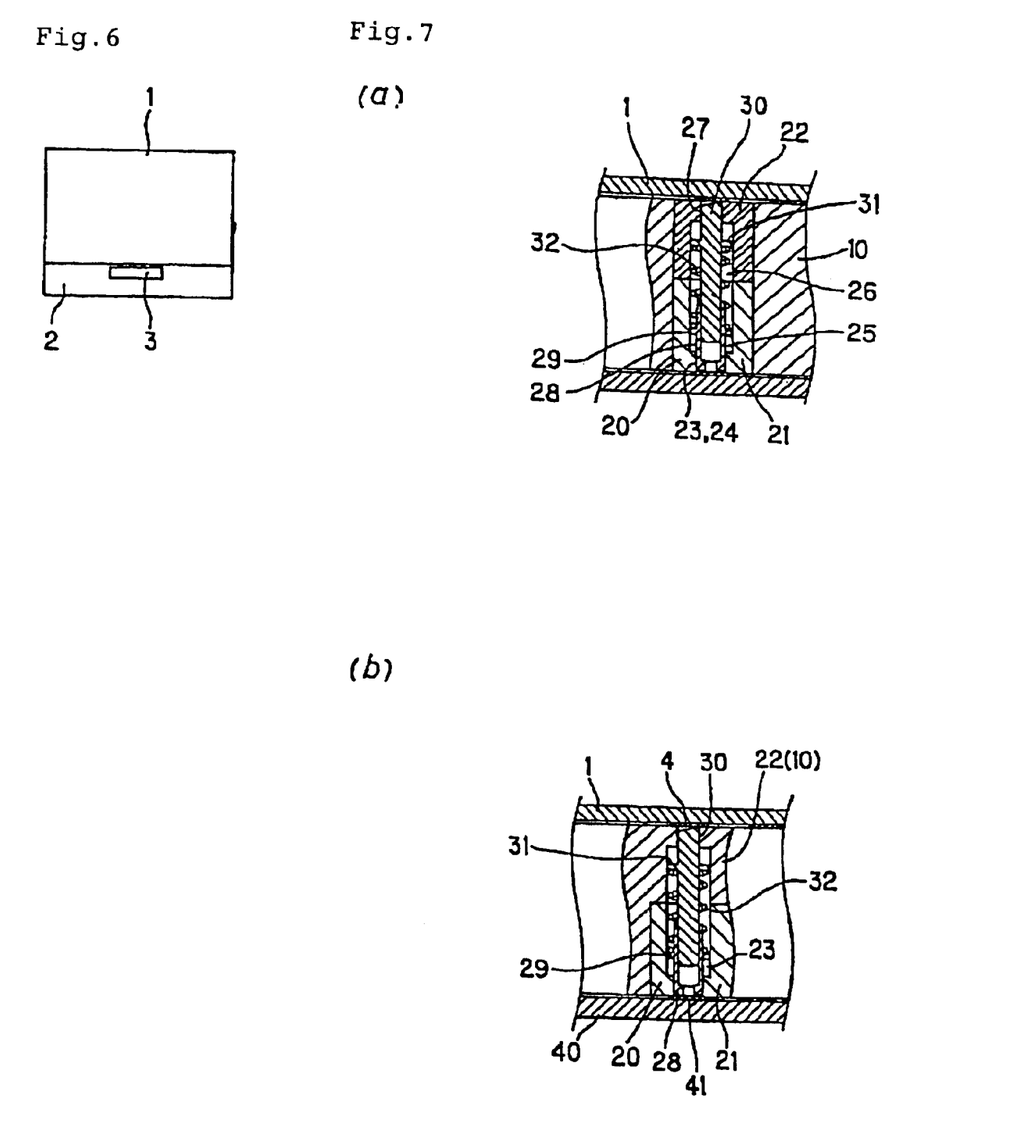
FIG. 6 is an illustrative view showing a liquid crystal module in an embodiment of a press-contact type connector for cellular phones and its connecting structure according to the present invention.
FIG. 7 is a partial illustrative view showing an embodiment of a press-contact type connector for cellular phones and its connecting structure according to the present invention, (a) a sectional illustrative view showing a case where a separate housing is built in a light guide, (b) a sectional illustrative view showing a case where a plate of a housing is molded as a part of a light guide and another plate is assembled in the light guide.

Cellular phone liquid crystal module 1 is basically formed in a thin plate shape as shown in FIG. 6, and is formed with a glass electrode 2 at the lower part of its obverse surface. A liquid crystal IC driver 3 is mounted in this glass electrode 2. As shown in FIGS. 2 to 5, light guide 10 is basically formed in a rectangular shape using transparent polycarbonate or the like which is excellent in impact resistance etc., and includes a rectangular, liquid crystal module setter 11 for the liquid crystal module and fixing claws 12 disposed at the upper side and both sides enclosing the setter 11 for engagement of the liquid crystal module. Light guide 10 may be formed using multi-purpose engineering plastics which are excellent in heat resistance, dimensional stability, moldability and the like, specifically, ABS resin, polypropylene, polyvinyl chloride, polyethylene and the like.

As shown in FIGS. 7(a) and 7(b) to FIG. 10, housing 20 is formed in a flat rectangular shape by laminating a pair of elongated thin plates 21 and 22, one over the other, and has small-diametric passage holes 23 formed in a row along the length at intervals of a predetermined pitch (e.g. 0.5 to 1.27 mm). Each plate 21 and 22 is molded into a plate, using multi-purpose engineering plastics which are excellent in heat resistance, dimensional stability, moldability and the like, specifically, ABS resin, polycarbonate, polypropylene, polyvinyl chloride, polyethylene, etc. Among these, transparent polycarbonate is the most suitable.

For integration of housing 20, a separate housing 20 may be built into light guide 10 (see FIG. 7(a)). Alternatively, plate 22 as at least part of housing 20 may be molded as a part of light guide 10 while plate 21 may be separately built into light guide 10 (see FIG. 7(b)).

Each passage hole 23 is composed of, as shown in FIG. 7(a), a reduced-diametric bore 24 formed in the lower plate 21, a large-diametric bore 25 located above and continuous from the reduced-diametric bore 24 via a step, a large diametric bore 26 formed in the upper plate 22 and continuous from the large-diametric bore 25 of the lower plate 21, and a reduced-diametric bore 27 located above and continuous from the large-diametric bore 26 via a step.

Figure 8:
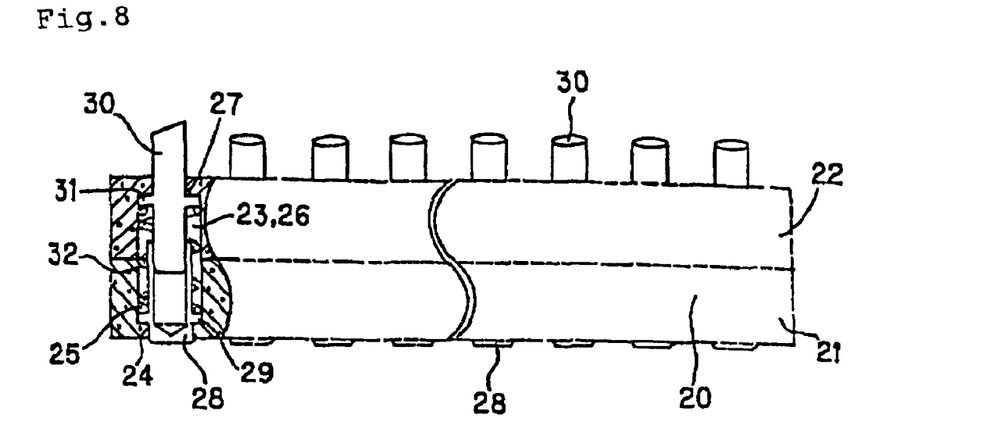
FIG. 8 is a partial sectional illustration showing an embodiment of a press-contact type connector for cellular phones according to the present invention.
Figure 9:
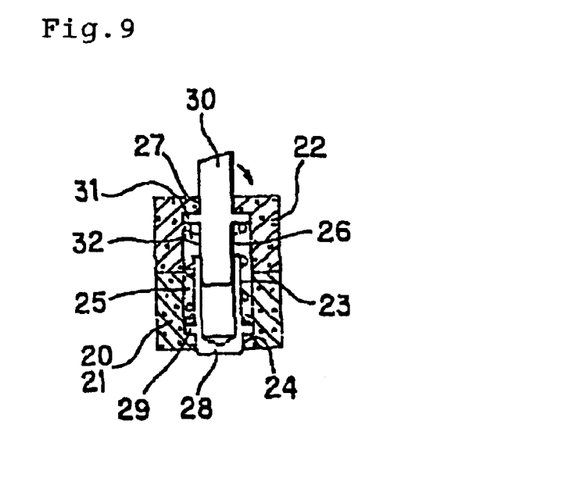
FIG. 9 is a side view of FIG. 8.
Figure 10:
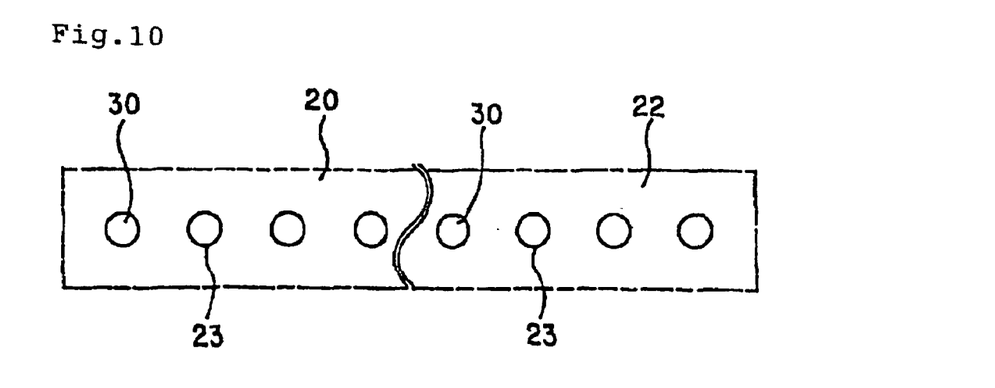
FIG. 10 is a plan view of FIG. 8.
Figure 11:
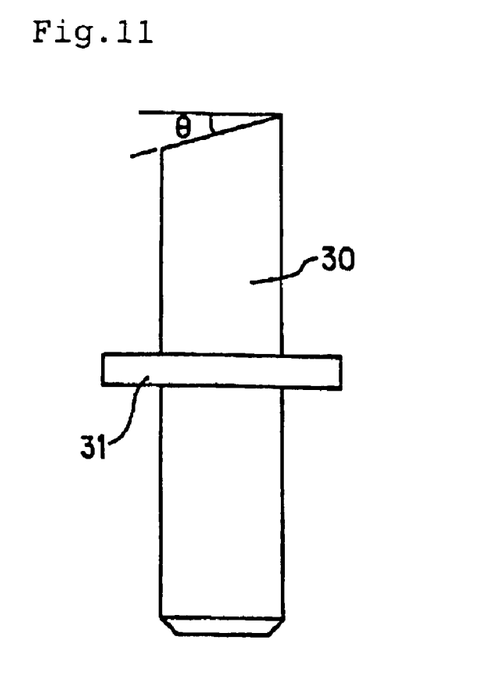
FIG. 11 is an illustrative view showing a conductive head pin in an embodiment of a press-contact type connector for cellular phones and its connecting structure according to the present invention.
Figure 12:
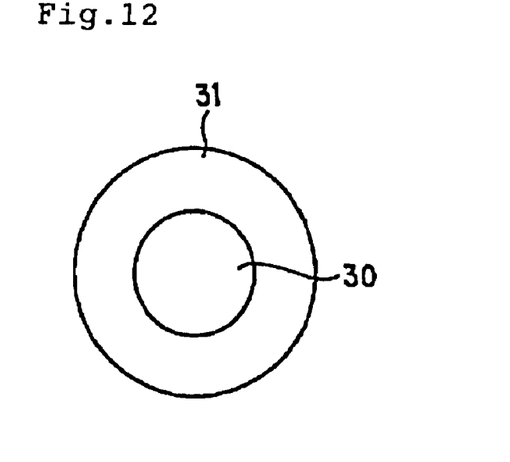
FIG. 12 is a plan view of FIG. 11.

Each conductive toe-pin 28 is formed of, as shown in FIGS. 7 to 9, a cylinder with a bottom having a U-shaped section, using nickel-plated or gold plated conductive material such as copper, brass, aluminum, etc. The underside of this hollow, conductive toe-pin 28 sticks out from the undersurface of plate 21 and is connected to an electrode 41 of an electronic circuit board 40 with a solder layer, ACF or the like, to establish reliable conduction. An annular engagement flange 29 is projected radially outwardly from the outer peripheral side of conductive toe-pin 28. This engagement flange 29 engages the stepped portion between the reduced-diametric bore 24 and large-diametric bore 25 in plate 21, so as to effectively prevent conductive toe-pin 28 from falling or dislodging.

Each conductive head pin 30, as shown in FIGS. 7 to 12, is basically formed in a cylindrical shape, using gold plated conductive material such as copper, brass, aluminum, etc. This conductive head pin 30 has an annular engagement flange 31 which is projected radially outwardly from the outer peripheral side thereof. This engagement flange 31 engages the stepped portion between the large-diametric bore 26 and reduced-diametric bore 27 in plate 22, so as to prevent conductive head pin 30 from dislodging or the like. The upper part of conductive head pin 30 is projected from the upper plate 22 (by about 0.1 to 1.5 mm, preferably 0.1 to 1.0 mm, for example), so as to come in elastic contact with electrode 4 of liquid crystal module 1, establishing conduction. The top end face at the distal end of conductive toe-pin 30 is inclined by an angle θ of 3° to 30° with respect to a plane perpendicular to the axis of passage hole 23, preferably by an angle θ of 10° to 20°, or more preferably by an angle θ of about 15°, so that a point radially and outwardly offset from the center comes into elastic contact with electrode 4 of liquid crystal module 1.

Further, each coil spring 32 is formed using a fine metallic wire of phosphor bronze, copper, stainless steel, beryllium bronze, piano wire or one of these plated with gold, and is fitted over conductive toe-pin 28 and conductive head 30 and interposed between these engagement flanges 29 and 31. This coil spring 32 can be formed by a simple structure by winding a fine metallic wire having a diameter of 30 to 100 μm, preferably 30 to 80 μm with a consistent pitch of 50 μm, for example, so as to generate a load of 30 to 60 g, for example, when it is compressed by 0.5 mm. The reason for the diameter of the coil spring 32 being limited within the range of 30 to 100 μm is that selection from this range makes it easy to realize a low-cost and low-load connection. The load of coil spring 32 when compressed is determined as appropriate depending on the condition of connection.

Each coil spring 32 should be about 0.5 to 3.0 mm, preferably 1.0 to 1.5 mm in length. Limiting the length within the above range makes it possible to shut out adverse effect due to noise from the outside and maintain the resilient characteristics.

In the above configuration, to create conduction between liquid crystal module 1 and electronic circuit board 40, the liquid crystal module 1 should be put into setter 11 of light guide 10 and fixed by engagement fixing claws 12 and then electronic circuit board 40 should be assembled from the conductive toe-pin 28 side on the opposite side (see FIG. 7). As a result, each conductive toe-pin 28 and conductive head pin 30, both projected from light guide 10, retract opposing the coil spring 32 and come close to one another, so that the conductive head pin 30 is slightly inclined and its outer peripheral surface comes into contact with the inner peripheral surface of conductive toe-pin 28. Thus, the contact between conductive toe-pins 28 and conductive head pins creates a current conduction path 30 without passing through coil springs 32, which would be a cause of high resistance and establishes conduction between liquid crystal module 1 and electronic circuit board 40.

According to the above configuration, since light guide 10 and a press-contact type connector are integrated instead of press fitting a separate press-contact type connector into the attachment hole of light guide 10, it is possible to markedly effectively prevent the press-contact type connector from being set skewed or being buckled, and it is also possible to achieve remarkably easy assembly into the cellular phone, hence reducing the cost. Since no attachment hole needs to be formed in light guide 10, it is possible to completely omit the forming step of a high-accuracy attachment hole. Further, conductive head pin 30 and coil spring 32 are integrated so that conductive head pin 30 can reciprocate within conductive toe-pin 28, it is possible to make the height dimension markedly small (e.g., about 1.50 to 2.00 mm), thus making it possible to make the conduction path short.

Since inclination of the top end face of conductive head pin 30 at the predetermined angle θ makes the conductive head pin 30 come into contact with conductive toe-pin 28, not perpendicularly, but being inclined with its center of gravity set off when it contacts, it is possible to prevent contact failure and create a low-resistance conductive path between conductive toe-pin 28 and conductive head pin 30. Accordingly, in contrast to the conduction path by way of long coil spring 32, it is possible to realize a marked reduction in inductance by shortening the conduction path, and hence impart excellent high-frequency characteristics. Specifically, stable low resistance as low as one-third of the conventional configuration and low-load connection (e.g., approximately 30 to 60 g/pin) can be highly expected, which will contribute to prevention of breakage of liquid crystal module 1.

Further, since conductive head pin 30 moves while rubbing in contact inside conductive toe-pin 28, this simple configuration produces the cleaning effect of prompt removal of dust and oxide coating adhering to the contact portion. Moreover, since coil spring 32 is held between engagement flanges 29 and 31 of conductive toe-pin 28 and conductive head pin 30, this enables markedly easy assembled. Still more, since the press-contact type connector is assembled by sandwiching the conductive portion from above and below with a pair of plates 21 and 22, it is possible to effectively prevent conductive toe-pin 28, conductive head pin 30 and coil spring 32 from being shifted, dislodging and falling off.

Figure 13:
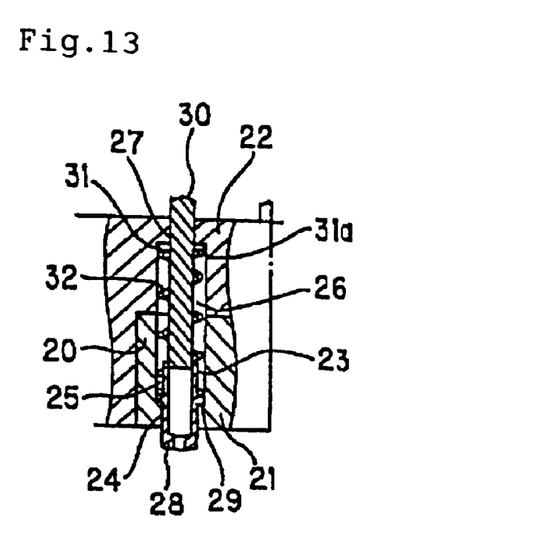
FIG. 13 is a partial sectional illustration showing the second embodiment of a press-contact type connector for cellular phones according to the present invention.

Next, FIG. 13 shows the second embodiment of the present invention, wherein the opposing face 31a that opposes engagement flange 29 of conductive toe-pin 28, in the engagement flange 31 of each conductive head pin 30, i.e., the underside of the flange 31, is inclined.

Opposing face 31a of engagement flange 31 is inclined at a predetermined angle θ with respect to a plane perpendicular to the axis of passage hole 23 or conductive head pin 30. Specifically, the face is inclined at an angle θ of 3° to 30°, preferably at an angle θ of 10° to 20°, more preferably, an angle θ of about 15°. The upper part of conductive head pin 30 is formed conically and projects from the upper plate 22 (by, for example, about 0.1 to 1.5 mm, preferably, 0.1 to 1.0 mm), so as to come into elastic contact with electrode 4 of liquid crystal module 1, establishing conduction. The other components are the same as the above embodiment, so the description is omitted.

Also in this embodiment, the same operation and effect can be expected. Further, inclination of the lower side of engagement flange 31 at the predetermined angle θ also makes it possible to limit rotation of each conductive head pin 30, thereby being effective in preventing irregular pitches. In regard to this, when the top end face of each conductive toe-pin 30 is inclined instead of the lower face of engagement flange 31 being inclined at the predetermined angle θ, each conductive head pin 30 is liable to rotate. As a result, there is more than a small risk that the pointed topmost ends of conductive head pins 30 shift left or right or front or rear as they rotate, and the pitches between the top end faces of adjacent conductive head pins 30 vary, causing conduction defects.

In contrast to this, according to the present embodiment, the undersurface of engagement flange 31 is inclined in one direction so as to give directivity, and coil spring 32 is pressed into contact with this inclined face in such a way that the spring end is made to move along this inclined face. Therefore, each conductive head pin 30 will hardly slip and rotate at all. As a result, there is no risk that the pointed topmost end of conductive head pin 30 will shift left or right or front or rear, and that the pitches between the top end faces of adjacent conductive head pins 30 will vary, causing conduction defects.

Figure 14:
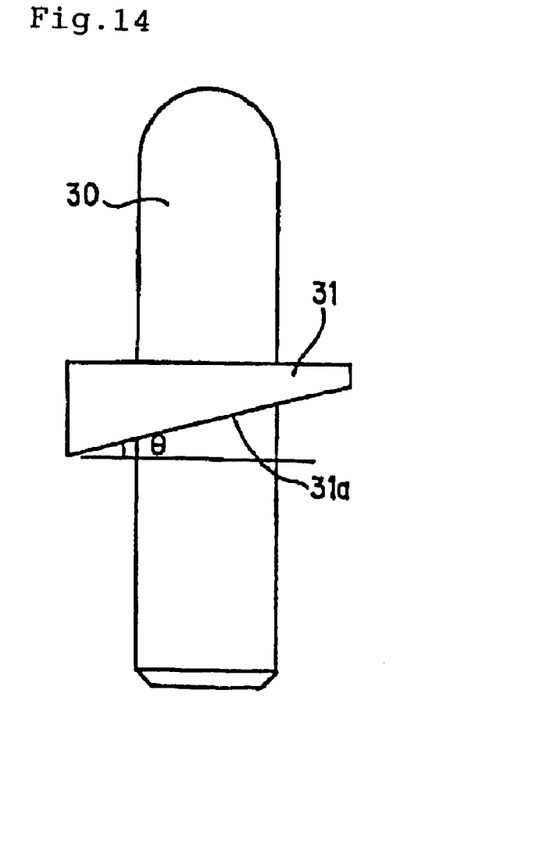
FIG. 14 is an illustrative view showing a conductive head pin in the third embodiment of a press-contact type connector for cellular phones and its connecting structure according to the present invention.

Next, FIG. 14 shows the third embodiment of the present invention, wherein the opposing face 31a that opposes engagement flange 29 of conductive toe-pin 28, in the engagement flange 31 of each conductive head pin 30 is inclined and the upper part of conductive head pin 30 is hemispherically formed so as to be projected from the upper plate 22. The other components are the same as the above embodiment, so the description is omitted.

Also in this embodiment, it is apparent that the same operation and effect can be expected.

Figure 15:
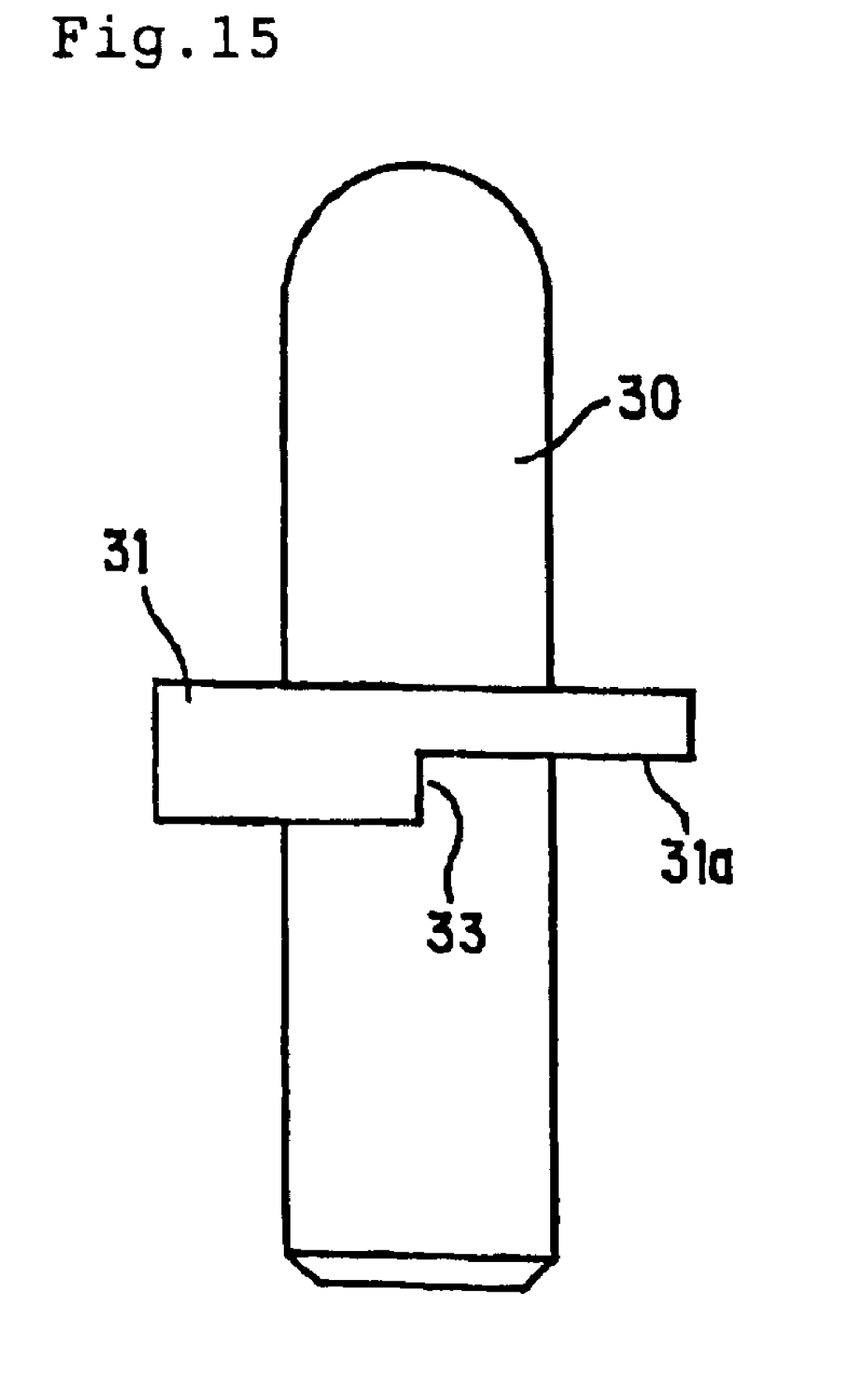
FIG. 15 is an illustrative view showing a conductive head pin in the fourth embodiment of a press-contact type connector for cellular phones and its connecting structure according to the present invention.

Next, FIG. 15 shows the fourth embodiment of the present invention, wherein the undersurface of engagement flange 31 that opposes engagement flange 29 of conductive toe-pin 28, in the engagement flange 31 of each conductive head pin 30 is partly formed with a stepped portion 33 having an approximately Z-shaped section, and a coil spring 32 is disposed between the engagement flange 29 of each conductive toe-pin 28 and the stepped portion 33 of engagement flange 31 so that the coil spring 32 elastically urges conductive head pin 30 toward the top face of housing 20. The other components are the same as the above embodiment, so the description is omitted.

Also in this embodiment, the same operation and effect can be expected. Further, since the end of coil spring 32 is strongly pressed against the, incised and projected, stepped portion 33 on the underside of engagement flange 31, conductive toe-pin 30 will hardly slip and rotate at all. Accordingly, there is no risk that when the topmost end of conductive head pin 30 is inclined and pointed, the pointed topmost end will shift left or right or front or rear, the pitches between the top end faces of adjacent conductive head pins 30 will vary, and that conduction defects will occur. This configuration is markedly effective when the undersurface of engagement flange 31 cannot be inclined at a predetermined angle θ.

Figure 1:
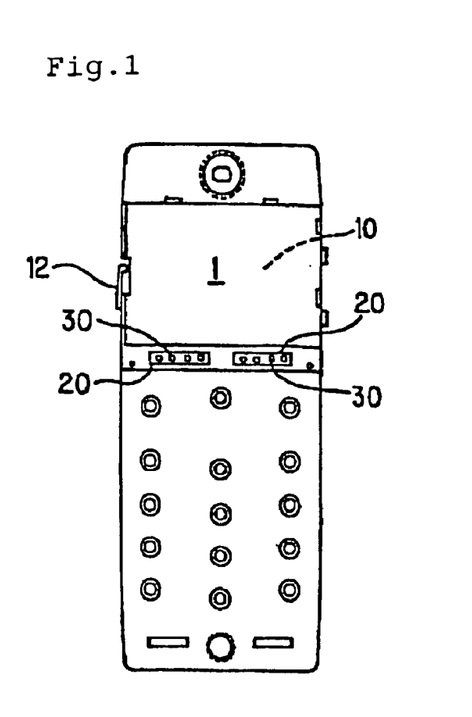
FIG. 1 is an illustrative view showing a cellular phone to which an embodiment of a press-contact type connector for cellular phones according to the present invention is applied.
Figure 2:
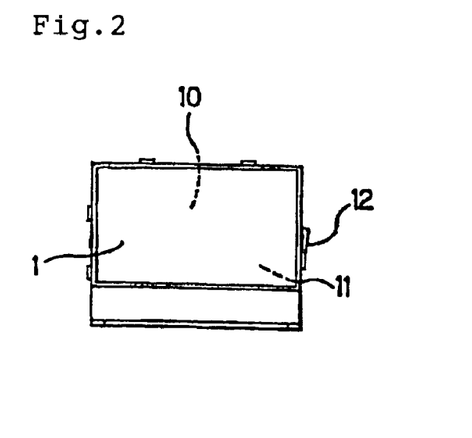
FIG. 2 is an illustrative view showing the combined state of a light guide and a liquid crystal module in an embodiment of a press-contact type connector for cellular phones according to the present invention.
Figure 3:
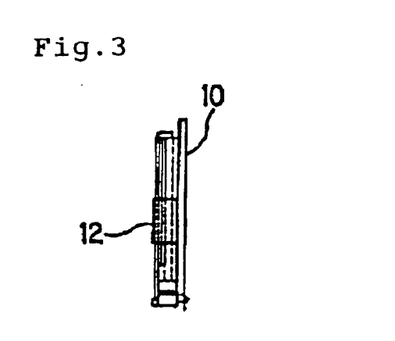
FIG. 3 is a side view of FIG. 2.
Figure 4:
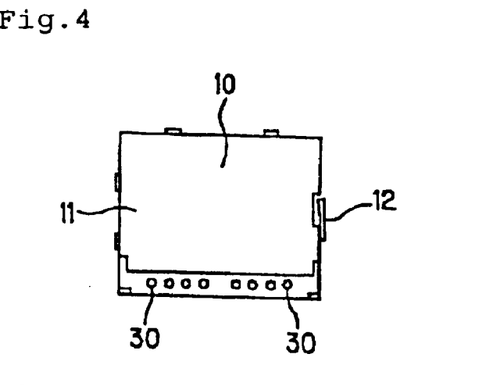
FIG. 4 is an illustrative view showing a light guide in an embodiment of a press-contact type connector for cellular phones and its connecting structure according to the present invention.
Figure 5:
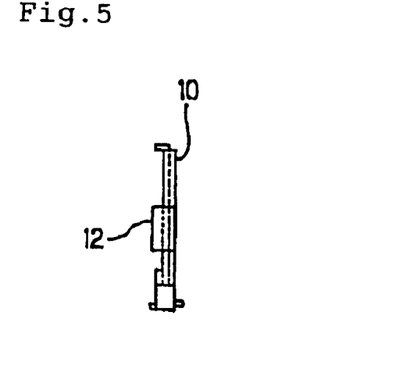
FIG. 5 is a side view of FIG. 4.

Though description of the above embodiment was made referring to light guide 10 with only liquid crystal module 1 mounted therein, the present invention should not be limited thereto. For example, a resin-formed one-piece light guide 10 with the assembly performance of parts such as acoustic parts, keypads (film-like contacts) and the like being taken into account may be formed as shown in FIG. 1, and other press-contact type connectors in light guide 10 may be used for electric connections between the parts and the circuit board so as to reduce the number of parts. Further, though housing 20 with a row of passage holes 23 arranged in the length thereof was described in the above embodiment, the arrangement of the holes may be modified freely such that two, three or four rows maybe formed. The number of conductive toe-pins 28 and conductive head pins 30 may be increased or decreased as appropriate.

Though the above embodiment was described with reference to cylindrical, conductive toe-pins 28 with a bottom having a U-shaped section, the present invention should not be limited thereto. For example, the conductive toe-pin 28 may be formed as a hollow, prism shape with a bottom, or the bottom of conductive toe-pin 28 may be changed, as appropriate, into a conical shape, frustoconical shape, or a shape having a semicircular section. Further, a hole may be formed in the bottom of conductive toe-pin 28 when manufactured so that the interior of conductive toe-pin 28 can be plated with gold utilizing this hole. This configuration makes the gold plating process easy. Moreover, flange 29 may be projected outwardly from the outer peripheral surface of conductive toe-pin 28. Still more, conductive head pin 30 may be formed in a prism shape and may be formed to be hollow instead of being solid.

INDUSTRIAL APPLICABILITY

As described heretofore, the present invention is effective in preventing a connector from being set skewed, in a reliable manner. Further, it is possible to shorten the conduction path by reducing the height dimension of the connector and realize an electric connection with low loads.

What is claimed is:

1. A press-contact type connector for cellular phones, comprising:
    a housing;
    a light guide to which at least a liquid crystal module is mounted, the housing and light guide being integrated;
    a hollow, conductive toe-pin which is inserted in a passage hole of a housing and exposed from one side of the housing; and
    a conductive head pin which is fitted into the conductive toe-pin and is slidably projected from the opposite side of the housing; and
    a spring element provided between the conductive toe-pin and the conductive head pin so as to urge at least the conductive head pin in the direction of the opposite side of the housing.

2. The press-contact type connector for cellular phones according to claim 1, wherein the distal end of the conductive head pin is inclined at a predetermined angle with respect to a plane perpendicular to the axis of the passage hole of the housing, so that the conductive head pin is contacted with the conductive toe-pin in an inclined position within the conductive toe-pin, establishing a conduction path between the conductive toe-pin and conductive head pin thus in contact.

3. The press-contact type connector for cellular phones according to claim 1, wherein an engagement flange for the spring element is projected outwardly from the outer peripheral surface of each of the conductive toe-pin and the conductive head pin, the opposing face that opposes the engagement flange of the conductive toe-pin, of the engagement flange of the conductive head pin is inclined at a predetermined angle with respect to a plane perpendicular to the axis of the passage hole, so that the conductive head pin is contacted with the conductive toe-pin in an inclined position within the conductive toe-pin, establishing a conduction path between the conductive toe-pin and conductive head pin thus in contact.

4. A connecting structure for a press-contact type connector for cellular phones, characterized in that the press-contact type connector for cellular phones comprises:

a housing;

a light guide to which at least a liquid crystal module is mounted, the housing and light guide being integrated;

a hollow, conductive toe-pin which is inserted in a passage hole of a housing and exposed from one side of the housing;

a conductive head pin which is fitted into the conductive toe-pin and is slidably projected from the opposite side of the housing; and a spring element is provided between the conductive toe-pin and the conductive head pin so as to urge at least the conductive head pin in the direction of the opposite side of the housing, wherein the press-contact type connector is disposed between a pair of opposing electrodes so as to establish conduction.

5. The connecting structure for a press-contact type connector for cellular phones according to claim 4, wherein the distal end of the conductive head pin is inclined at a predetermined angle with respect to a plane perpendicular to the axis of the passage hole of the housing, so that the conductive head pin is contacted with the conductive toe-pin in an inclined position within the conductive toe-pin, establishing a conduction path between the conductive toe-pin and conductive head pin thus in contact.

6. The connecting structure for a press-contact type connector for cellular phones according to claim 4, wherein an engagement flange for the spring element is projected outwardly from the outer peripheral surface of each of the conductive toe-pin and the conductive head pin, the opposing face that opposes the engagement flange of the conductive toe-pin, of the engagement flange of the conductive head pin is inclined at a predetermined angle with respect to a plane perpendicular to the axis of the passage hole, so that the conductive head pin is contacted with the conductive toe-pin in an inclined position within the conductive toe-pin, establishing a conduction path between the conductive toe-pin and conductive head pin thus in contact.

7. The press-contact type connector for cellular phones according to claim 1, wherein the spring element is integrated with the conductive head pin.

8. The connecting structure for a press-contact type connector for cellular phones according to claim 4, wherein the spring element is integrated with the conductive head pin.

* * * * *

UNITED STATES PATENT AND TRADEMARK OFFICE
CERTIFICATE OF CORRECTION

PATENT NO. : 6,921,298 B2
DATED : July 26, 2005
INVENTOR(S) : Yuichiro Sasaki

It is certified that error appears in the above-identified patent and that said Letters Patent is hereby corrected as shown below:

Column 8,
Line 34, delete "sage hole of a housing" and substitute -- sage hole of the housing --.

Column 9,
Line 5, delete "sage hole of a housing" and substitute -- sage hole of the housing --.

Signed and Sealed this

Twenty-fourth Day of January, 2006

JON W. DUDAS
*Director of the United States Patent and Trademark Office*